July 20, 1937.                 B. D. McINTYRE                     2,087,351
                              VEHICLE CONSTRUCTION
                              Filed March 23, 1936
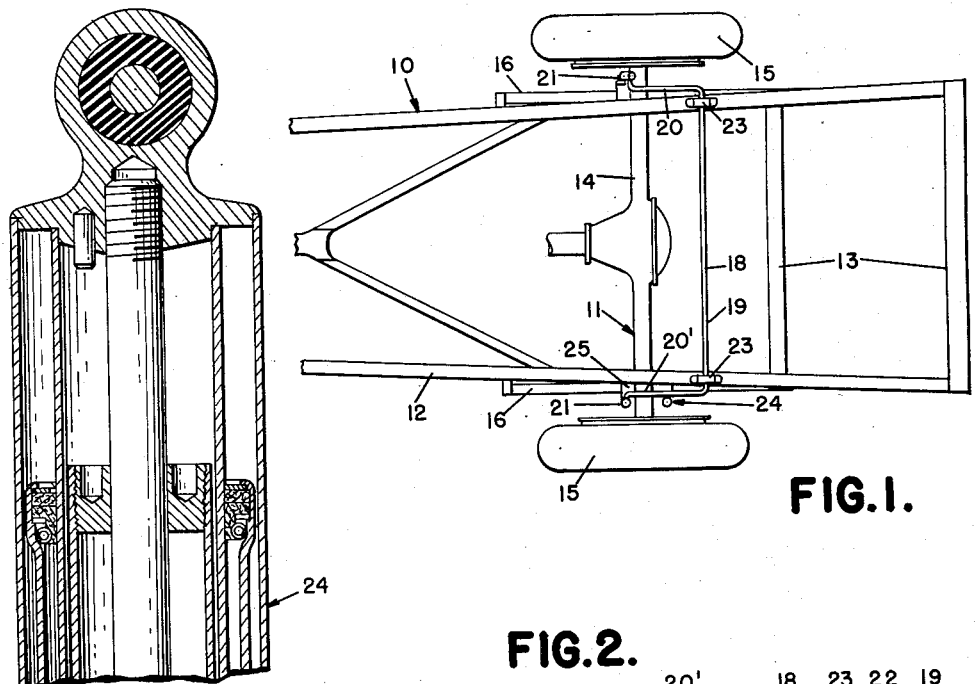
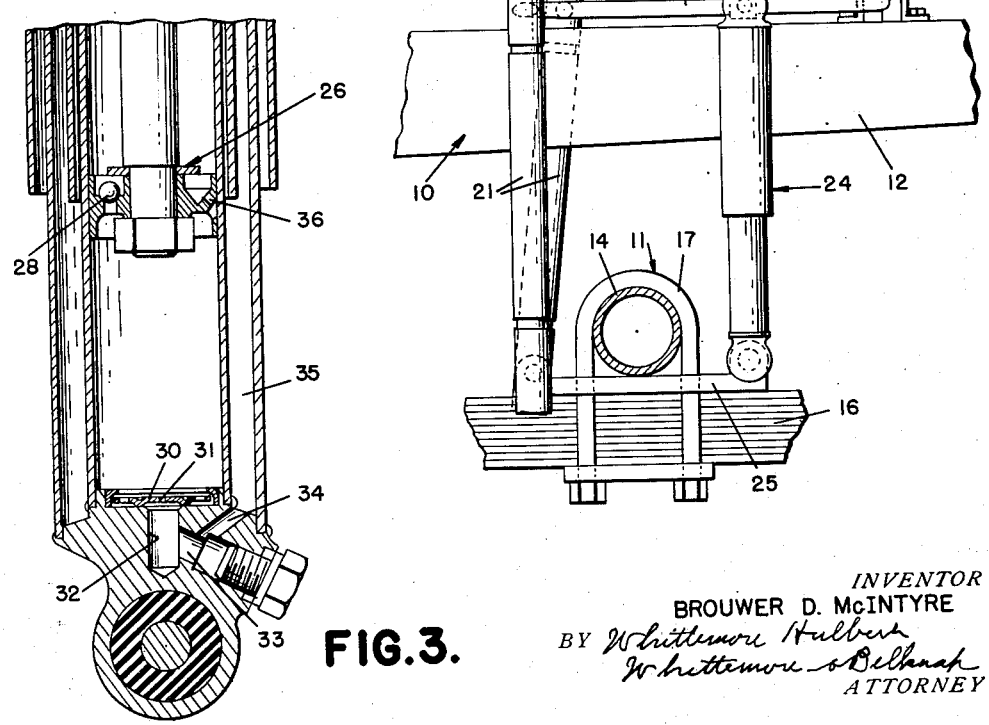
INVENTOR
BROUWER D. McINTYRE
ATTORNEYS Patented July 20, 1937

2,087,351

UNITED STATES PATENT OFFICE 2,087,351

VEHICLE CONSTRUCTION

Brouwer D. McIntyre, Monroe, Mich., assignor to Monroe Auto Equipment Company, Monroe, Mich., a corporation of Michigan Application March 23, 1936, Serial No. 70,435

9 Claims. (Cl. 267—11)

This invention relates generally to vehicles and refers more particularly to an improved sway eliminator and shock absorber assembly for vehicles.

One of the principal objects of the present invention resides in the provision of a sway eliminator assembly embodying a torsional stabilizing bar and a single shock absorber installed to control the action of the suspension springs at opposite sides of one end of the vehicle through the stabilizing bar.

Another advantageous feature of the present invention resides in the provision of an assembly of the character set forth in the preceding paragraph rendering it possible to locate the shock absorber at one side of the vehicle and at the same time, to provide uniform control of the suspension means at opposite sides of the vehicle irrespective of the degree of twisting of the bar resulting from deflection of the suspension means.

The foregoing, as well as well as other objects, will be made more apparent as this description proceeds, especially when considered in connection with the accompanying drawing, wherein:

Figure 1 is a plan view of a portion of a vehicle equipped with a sway eliminator assembly constructed in accordance with this invention;

Figure 2 is a side elevational view of the construction shown in Figure 1; and

Figure 3 is a longitudinal sectional view through one type of double-acting shock absorber that may be employed in the assembly.

Referring now to the drawing, it will be noted that there is illustrated in Figure 1, a portion of a vehicle having a sprung assembly 10 and having an unsprung assembly 11. In the present instance, the sprung assembly comprises a frame 12 having laterally spaced longitudinally extending side sills secured in assembled relation to each other by suitable cross members designated generally herein by the reference character 13. The unsprung assembly 11 comprises an axle 14 extending transversely of the frame 12 beneath the same and carrying road engaging wheels 15 at opposite ends thereof. Although various different types of suspension systems may be employed without departing from the spirit and scope of this invention, nevertheless, for the purpose of illustration, I have shown the sprung assembly 10 as supported from the unsprung assembly 11 by means of conventional semi-elliptical leaf springs 16 extending longitudinally of the frame 12 at opposite sides thereof. Upon reference to Figure 1, it will be noted that the free ends of the springs are suitably connected to the adjacent sill members of the frame 12 and the central portions of these springs are secured to the axle 14 by means of the U-bolts 17.

In order to eliminate side sway of the sprung weight or, in other words, in order to maintain the normal plane of the body of the vehicle substantially parallel with the plane of the axle when the vehicle is turned either to the right or to the left, I provide means in the form of a stabilizer 18 comprising a spring steel bar 19 mounted upon one of the aforesaid assemblies with the body portion extending transversely of the vehicle and with the free ends connected to the other of the assemblies. Although it is immaterial, insofar as the principle of operation of the present invention is concerned, which of the assemblies is selected for mounting the sway bar 19, nevertheless, for the purpose of illustration, I have shown the bar 19 as supported on the sprung weight and as having the free ends connected to unsprung weight or axle 14 of the vehicle. As shown in Figure 1, the opposite ends of the body portion of the spring bar 19 are provided with arms 20 extending in a forward direction longitudinally of the frame 12 beyond opposite sides of the latter. The free ends of the arms 20 are connected to the unsprung weight or axle 14 by means of links 21 and the body portion of the bar is journalled in rubber blocks 22 secured to the sills of the frame 12.

The links 21 may of any suitable construction capable of effecting a silent and positive connection between the ends of the arms 20 and the unsprung weight. On the other hand, the rubber blocks 22 are supported in retainers 23 under compression insufficient to prevent rocking movement of the spring bar, but effective to dampen the action of the bar sufficiently to control, to a certain extent, the action of the suspension means 16.

With the construction thus far described, it will be noted that relative movement between the sprung and unsprung weights at one side of the vehicle will be transmitted through the spring bar 19 tending to effect a similar relative movement between these assemblies at the opposite side of the vehicle. In other words, as the suspension means on one side of the vehicle tends to deflect relative to the suspension means on the opposite side of the vehicle, the latter suspension means will react through the spring bar to resist the deflection of the former suspension means. It will, of course, be understood that the bar 19 does not effect a rigid connection between the opposite sides of the sprung and unsprung weights, since such an arrangement would have a tendency to effect an exceedingly rough ride. As a matter of fact, the dimension of the bar 19 is so selected as to permit the same to wrap or twist to a limited extent upon relative deflection of the suspension means on opposite sides of the vehicle.

Although the action of the suspension springs 16 is controlled, to a certain extent, by the rubber blocks 22 acting upon the stabilizer bar 19, nevertheless, it is desirable to further control the action of the suspension springs by means including a shock absorber 24 in the assembly. As distinguished from conventional practice, only one shock absorber is employed at one side of the vehicle to control the action of the suspension springs 16 at opposite sides of the vehicle, through the medium of the stabilizer 18. As shown particularly in Figure 2, the shock absorber 24 is of the double-acting tubular type having the upper end connected to the arm 20' of the bar 19 at a predetermined point in the length of the arm and having the lower end connected to the axle 14 of the vehicle through the medium of a plate 25 clamped to the upper side of the associated leaf spring 16 by means of the U-bolts 17.

Inasmuch as the bar 19 twists or wraps, to a certain extent, upon relative deflection of the suspension springs 16 on opposite sides of the vehicle and, in view of the fact that swinging movement of the arm 20' is resisted to a greater extent than the arm 20 by reason of the shock aborber connected to the former, it necessarily follows that the arm 20 would have a tendency to move a greater distance than the arm 20', providing that both arms are of the same length. The difference in the extent of movement of the two arms would approximate the degree of twist or wrap in the bar 19 and would result in unequalized shock absorber control of the suspension springs. To avoid this objection, the arm 20 is shorter than the arm 20' by an amount determined in dependence upon the degree of inherent twist or wrap present in the bar 19 and upon the point of connection of the upper end of the shock absorber 24 with the arm 20'. It necessarily follows, therefore, that the relative difference in length between the two arms of the stabilizer bar will vary in dependence upon the particular installation. In any event, however, the length of the arm 20 is predetermined to compensate for the degree of wrap of the bar 19, or, in other words, is determined to move throughout the same distance as the arm 20' so as to effect equalized shock absorber control of the suspension springs on opposite sides of the vehicle.

In Figure 3 of the drawing, I have shown one particular type of double-acting shock absorber that may be employed in the above combination, although it is to be understood that any one of the numerous different constructions of double-acting shock absorbers may be utilized to effect the same results. Briefly, it will be noted from Figure 3 that the construction is such that when the piston 26 of the shock absorber travels downwardly, the pressure of the fluid below the piston unseats the check valve 28 and the fluid is permitted to flow freely through the piston from the lower end or pressure side of the latter to the upper end of the shock absorber. During this movement, the flapper valve 30 seats and any excess fluid in the lower end of the pressure cylinder escapes through the small orifice 31 and through the passages 32, 33 and 34 to the reservoir 35. On the return movement or, in other words, when the piston 26 is moved upwardly, the check valve 27 seats and the fluid passes from the upper end of the pressure cylinder 28 through the piston 26 to the lower end of the pressure cylinder. It is to be noted, however, that the fluid passing from the upper end of the pressure cylinder to the lower end thereof is compelled to flow through the restricted orifice 36 having a dimension predetermined to afford the resistance desired for absorbing the shock. It necessarily follows from the above that the upward movement of the piston is retarded in dependence upon the size of the orifice 36 and during this upward movement of the piston, the flapper valve 30 is raised from its seat so that the fluid may flow freely from the reservoir 35 through the passages 34, 33 and 32 into the lower end of the pressure cylinder 28 to compensate for the volume displaced by the piston rod.

Thus from the foregoing, it will be observed that I have provided a sway eliminator assembly including a stabilizer bar and a single shock absorber associated with one end of the bar, in such a manner as to provide equalized shock absorber control through the bar to the suspension means adjacent the opposite end of the bar.

It will, of course, be understood that this construction offers the possibility of eliminating at least one shock absorber and, in installations where the same is employed at both ends of the vehicle, permits eliminating two shock absorbers with the result that the cost of manufacture is appreciably reduced.

While in describing the present invention, particular stress has been placed upon the association of the sway eliminator assembly with the sprung weight of the vehicle adjacent one end of the latter, it is to be understood that this assembly may be supported in whole, or in part, upon the unsprung weight at either or both ends of the vehicle. Therefore, reservation is made to make such changes in details of construction that may come within the purview of the accompanying claims.

What I claim as my invention is:

1. In a vehicle having sprung and unsprung assemblies, a stabilizer comprising a torsion bar mounted on one of the assemblies for rocking movement and having arms of different length extending from the bar in a direction transverse to the axis of the bar and connected to the other assembly.

2. In a vehicle having sprung and unsprung assemblies, a stabilizer comprising a torsion bar mounted on one of the assemblies for rocking movement and having arms of different length extending from the bar in a direction transverse to the axis of the bar and connected to the other assembly, and a shock absorber having one end connected to the latter assembly and having the opposite end connected to the arm of greater length at a predetermined point in its length.

3. In a vehicle having a sprung assembly and an unsprung assembly supporting the sprung assembly at one end of the vehicle by suspension springs at opposite sides of the vehicle, a stabilizer comprising, a torsion bar mounted on one of the assemblies for rocking movement, arms spaced from each other axially of the bar and extending transverse to the axis of the bar for connection with the other assembly, said arms movable at substantially the same rate irrespective of the torsional twist of the bar, means at one side of the vehicle for controlling the action of both the aforesaid suspension springs comprising a shock absorber having relatively movable parts, one of the parts connected to the latter assembly and the other of the parts having a connection with the arm of the bar located at the same side of the vehicle as the means aforesaid.

4. In a vehicle having a sprung assembly and an unsprung assembly supporting the sprung assembly at one end of the vehicle by suspension springs at opposite sides of the vehicle, a stabilizer comprising, a torsion bar mounted on one of the assemblies for rocking movement, arms spaced from each other axially of the bar and extending transverse to the axis of the bar for connection with the other assembly, means at one side of the vehicle for controlling the action of both the aforesaid suspension springs comprising a shock absorber having relatively movable parts, one of the parts connected to the latter assembly and the other of the parts having a connection with the arm of the bar located at the same side of the vehicle as the means aforesaid, and the relative length of the arms and point of connection of the shock absorber with the last named arm being predetermined to substantially compensate for the twist in the bar in controlling the action of the suspension means at the side of the vehicle opposite the side upon which the shock absorber is located.

5. In a vehicle having sprung and unsprung assemblies, a stabilizer comprising a torsion bar mounted on one of the assemblies for rocking movement and having arms of different length extending from the bar in a direction transverse to the axis of the bar and connected to the other assembly, and a shock absorber having one end connected to the latter assembly and having the opposite end connected to the arm of greater length at a predetermined point in its length, the relative difference in length of the arms being predetermined to compensate for the degree of wrap of the bar and to insure movement of the free ends of the arms substantially equal distances.

6. In a vehicle having a sprung assembly and an unsprung assembly supporting the sprung assembly at one end of the vehicle by suspension springs at opposite sides of the vehicle, a stabilizer comprising, a torsion bar mounted on one of the assemblies for rocking movement, arms spaced from each other axially of the bar and extending transverse to the axis of the bar for connection with the other assembly, means at one side of the vehicle for controlling the action of both the aforesaid suspension springs comprising a shock absorber having relatively movable parts, one of the parts connected to the latter assembly and the other of the parts having a connection with the arm of the bar located at the same side of the vehicle as the means aforesaid, the stabilizer and point of connection of the shock absorber to the arm aforesaid providing substantially equalized control of the suspension springs at opposite sides of the vehicle.

7. In a vehicle having a sprung assembly and an unsprung assembly supporting the sprung assembly at one end of the vehicle by suspension springs at opposite sides of the vehicle, a stabilizer comprising a torsion bar mounted on one of the assemblies for rocking movement, arms extending from opposite end portions of the bar transverse to the axis of the latter and having the free ends thereof movable substantially throughout the same distances irrespective of the degree of wrap of the bar, means connecting the free ends of the arms to the other assembly, means at one side of the vehicle for controlling the action of both suspension springs comprising a shock absorber having relatively movable parts, one of the parts connected to the last named assembly and the other of the parts connected with the arm of the bar located at the same side of the vehicle as the shock absorber.

8. In a vehicle having sprung and unsprung assemblies, a stabilizer comprising a torsion bar mounted on one of the assemblies for rocking movement and having arms extending from opposite end portions of the bar in a direction transversely to the axis of the latter, means connecting the free ends of the arms to the assembly, and a shock absorber at one side of the vehicle having relatively movable parts, one of the parts being connected to the last named assembly and the other of the parts being connected to the arm at the same side of the vehicle as the shock absorber, the arm of the torsion bar at the opposite side of the vehicle being shorter than the arm to which the part aforesaid of the shock absorber is connected by an amount approximating the degree of twist of the bar.

9. In a vehicle having a sprung assembly and an unsprung assembly supporting the sprung assembly at one end of the vehicle by suspension springs at opposite sides of the vehicle, a stabilizer comprising a torsion bar mounted on one of the assemblies for rocking movement, means connecting one end of the bar to the other assembly, and means connecting the opposite end of the bar to the last named assembly embodying a shock absorber, said last named connection effective to compensate for the torsional twist in the bar and to provide uniform shock absorber control of the suspension means at opposite sides of the vehicle.

BROUWER D. McINTYRE.